3,619,949
MINIATURE BELT GRINDER
Walter N. Welsch, Tonawanda, and Louis J. Buchman, Eggertsville, N.Y., assignors to Dynabrade, Inc., Tonawanda, N.Y.
Filed June 12, 1970, Ser. No. 45,629
Int. Cl. B24b 23/00
U.S. Cl. 51—170 EB                          7 Claims

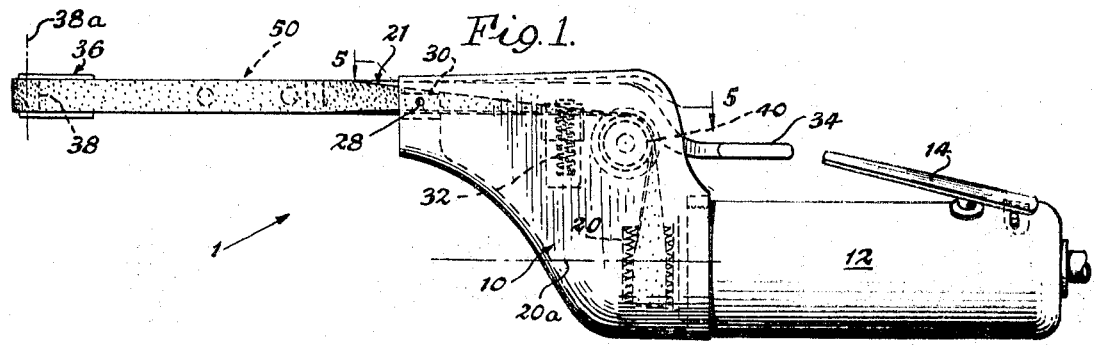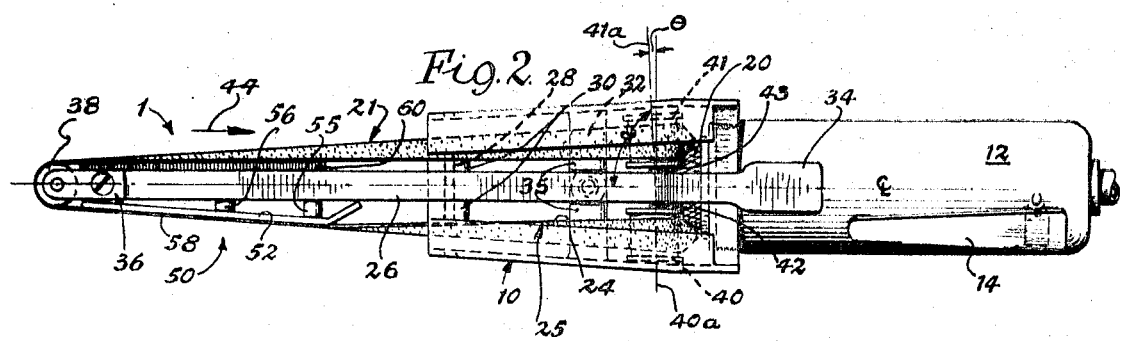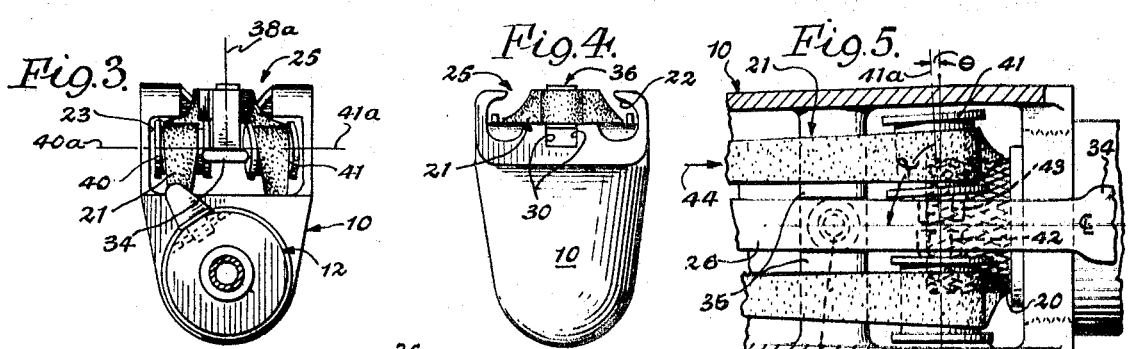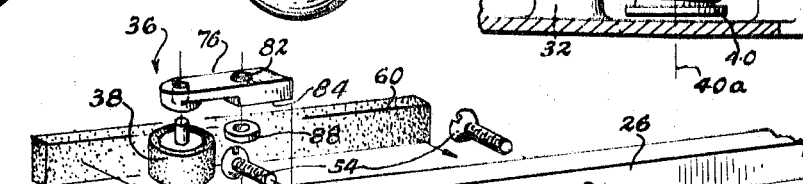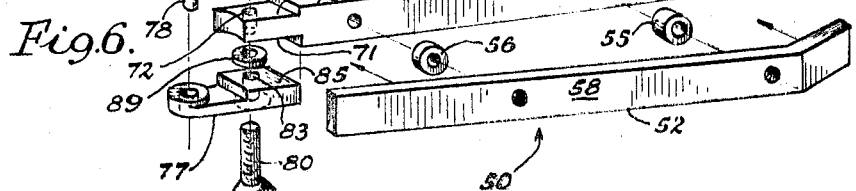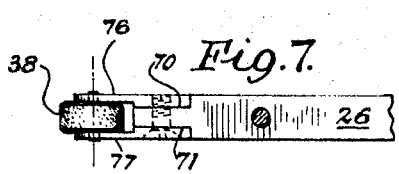
INVENTOR.
WALTER N. WELSCH
LOUIS J. BUCHMAN
BY
Bean & Bean
ATTORNEYS

# United States Patent Office 3,619,949
Patented Nov. 16, 1971

ABSTRACT OF THE DISCLOSURE

A hand tool grinder having an endless belt entrained about a non-parallel drive and idler pulleys such that the flights thereof pass over a pair of crown-surfaced direction change pulleys having their respective axes arranged non-parallel to each other and to the drive and idler pulleys. A guide device is provided to constrain the belt adjacent the idler pulley for flat surface grinding operations and a mounting arrangement is provided to permit interchangeable mounting of idler pulleys of both differing diameters and lengths.

BACKGROUND OF THE INVENTION

The invention relates to hand tool grinders particularly adapted for use in connection with small cavities or restricted openings in sheet metal, castings, forgings and the like for deburring and smooth finishing, and more particularly, to improvements in grinders of the type disclosed in U.S. Patent 3,427,757.

The grinder disclosed by U.S. Patent 3,427,757 represents a substantial improvement over prior art grinders in that it permits an easily replaceable endless abrasive belt to be employed in the finishing or polishing of surfaces, which hitherto were accessible only by solid grinding implements.

However, experience has brought to light several drawbacks or inefficiencies in grinder constructions of this type, which have to some extent limited commercial acceptance. In this respect, it has been noted that under operating conditions, the belt is ofttimes worn non-uniformly along its marginal edges, due to the manner in which the tool is used by a workman. When this condition occurs, sometimes within a matter of moments depending on the work and quality of the belt, there appears to be a tendency for the belt to stretch non-uniformly or elongate to a greater extent along that marginal edge subject to excess wear. This condition results in translation of the belt in a direction axially of the crown-surfaced direction change pulley, over which the belt moves from the idler pulley towards the drive pulley, in the direction of belt wear. When translation occurs, the worn marginal edge tends to ride off the direction change pulley or rubs against the upstanding rim thereof normally employed to prevent ride off, with the result that the belt is almost immediately destroyed. If the rims of such pulley are spaced a greater distance apart so as to permit a greater degree of translation before engagement of the belt with the rims, there is a tendency for the belt to ride off the other direction change pulley.

Another drawback of the grinder of the above enumerated patent, is its inability to finish or polish flat surfaces without effecting gouging thereof. This condition is apparently due to the tendency of the belt to return to its twisted condition, when the belt is forced to assume a flat condition as it is pushed into sliding engagement with its backup platen by the surface of the work being finished.

A further disadvantage of the grinder of the above-mentioned patent is that it requires that the idler pulley support arm be replaced each time it is necessary to reduce the diameter of the idler pulley in order to permit entry of the grinder through an access opening relatively small in a direction transversely of the grinder. Moreover, the construction of the idler pulley supporting arrangement, rather than the axial dimension of the idler pulley or vertical dimension of the support arm, places a limit on the height of access opening into which the grinder may be placed.

SUMMARY OF THE INVENTION

It is an object of the present invention to provide an endless belt grinder not subject to the disadvantage of the grinder disclosed in U.S. Patent 3,427,757.

After extensive tests, it has been unexpectedly found that the problem of belt translation axially of the return direction change pulley, that is, the pulley supporting the belt for movement from the idler pulley towards the drive pulley, may be overcome by a critical reorientation of the return pulley with respect to both the other direction change pulley and the idler pulley. Improved performance has been obtained when the axis of the return pulley is arranged at an angle of between about 1 and 3 degrees relative to the axis of the other direction change pulley; the axes of such pulleys are disposed within a plane intersected at substantially right angles by the axis of the idler pulley and diverge in the direction of the idler pulley; and the axis of the other direction change pulley is arranged at substantially right angles to a vertically disposed plane extending longitudinally of the casing and within which lies the axis of the idler pulley.

Experiments have indicated that the preferred angular deflection of the return pulley is 2°. Beneficial effects derived diminish progressively as the angular deflection approaches either 1 or 3°, with no improvement in past performance being noted below 1° or above 3°. Also, it has been determined that displacement of the axis of the return pulley from the horizontally disposed plane, which it defines with the other direction change pulley, adversely affects performance. Further, it has been found that reorientation of the axis of the other direction change pulley from that mentioned above has an adverse effect on the performance otherwise obtainable by the reorientation of the return pulley. The reason for this extremely critical angular relationship of the return pulley relative to the idler pulley and the other direction change pulley is not known or understood.

Another feature of the present invention is the provision of a guide device disposed intermediate the other direction change pulley and the idler pulley. The guide device defines a planer guide surface, which is arranged such that the belt is effectively maintained in a flattened condition while passing thereover, whereby preventing gouging of a flat work surface against which the belt is to be brought into contact.

The grinder of the present invention additionally includes an improved construction for mounting the idler pulley, which permits entry of the grinder into even more confined spaces for purposes of finish or polish operations than was possible with a similarly sized grinder of the type disclosed by the above-mentioned patent.

DRAWINGS

The present invention will now be more fully described with reference to the accompanying drawings wherein:

FIG. 1 is a side elevational view of the tool of the present invention;

FIG. 2 is a top plan view of the tool shown in FIG. 1;

FIG. 3 is a front elevational view of the tool shown in FIG. 1;

FIG. 4 is a rear elevational view of the tool shown in FIG. 1;

FIG. 5 is an enlarged fragmentary view of the area designated as FIG. 5 in FIG. 2;

FIG. 6 is an exploded perspective view showing the arrangement for mounting a belt supporting pulley on the end of the support arm; and FIG. 7 is a fragmentary side elevational view showing an alternative to the mounting illustrated in FIG. 6.

DETAILED DESCRIPTION

Now referring to the drawings in detail, the tool of the present invention is generally designated as 1 and shown as having a casing 10 to the rear of which is mounted a suitable pneumatically operated motor 12 to be grasped by the hand of an operator for the purpose of manipulating the tool. Motor 12 may have any suitable shut-off or speed control, such as a pivotally supported lever 14, which is adapted to be squeezed by the hand of the operator during use. However, it will be understood that the invention to be hereinafter described is not limited to the use of a pneumatically operated motor or the illustrated design of casing 10. Thus, if desired, the operating motor may be electric and housed within a casing of the type formed with a piston like grip, as shown in U.S. Pat. 3,427,757.

Extending forwardly of motor 12 through the rear of casing 10 is a drive shaft, not shown, for mounting a drive pulley 20 for rotation about an axis 20a extending generally longitudinally of casing 10. As will be more fully hereinafter described, pulley 20 serves to frictionally drive a flexible, endless abrasive belt 21.

Referring particularly to FIGS. 2, 3 and 4, it will be seen that the front, rear and upper surfaces of casing 10 are cut away, as at 22–24, respectively, so as to define a through opening, which is generally designated as 25.

An elongated arm 26 is positioned in opening 25 and supported for pivotal movement about an axis extending transversely of casing 10 by a pivotal pin or shaft 28, which has its ends mounted in lugs 30 formed as an integral part of the casing. A spring device, such as a coil spring 32, which is suitably mounted between the bottom of arm 26 and an internal portion of casing 10, is employed to continuously bias the arm for pivotal movement about pivot pin 28 in a counterclockwise direction, as viewed in FIG. 1. It will be understood, that the spring device serves to maintain desired operating tension on belt 21, when the latter is mounted on tool 1 in the manner to be more fully described.

The rear end of arm 26 terminates in a hand or thumb press lever extension 34, which may be employed to pivot the arm clockwise against the bias of spring 32 in order to permit removal and replacement of belt 21. Suitable means, such as lugs 35, which are formed as an integral part of the casing, may be employed to guide arm 26 during vertical, pivotal movement thereof.

As best shown in FIGS. 1, 2 and 4, arm 26 projects forwardly of casing 10 through cutout 22 and mounts adjacent the forward or freely projecting end thereof a support assembly 36, which journals an idler roller 38 for rotation about an axis 38a extending vertically and at a substantially right angle to a line running lengthwise of arm 26. It will be understood that in the normal operating position of arm 26, shown in FIG. 1, the axis of idler pulley 38 also extends substantially vertical with respect to casing 10.

A pair of crown-surfaced direction change pulleys 40 and 41 are supported on arm 26 by shafts 42, 43 for rotation about axes 40a, 41a, which extend generally transversely of both arm 26 and casing 10. Preferably, the crown surface angle of pulleys 40 and 41 is on the order of about 3° to insure proper tacking of belt 21. It will be understood from viewing FIG. 1 that pulleys 40 and 41 are arranged such that a horizontal line arranged tangent to their crowns substantially vertically bisects idler pulley 38, thereby insuring that belt 21 properly trains thereabout.

As will be apparent from the drawings, pulleys 40, 41 serve to support the flights of belt 21 extending between front idler pulley 38 and drive pulley 20, such that each flight of the belt is turned through substantially 90° in that portion thereof extending between drive pulley 20 and the direction change pulleys, and again through substantially 90° in that portion thereof extending between the direction change pulleys and idler pulley 38. During the latter portion of the belt flights, belt 21 is forced to closely straddle arm 26, thereby insuring that the belt affords a small frontal area in order to facilitate entry thereof through restricted access openings.

In the arrangement illustrated belt 21 is driven by drive pulley 20 for movement in the direction indicated by arrow 44, such that direction change pulleys 40 and 41 may be characterized as forward and return pulleys, respectively.

A particularly important feature of the present invention is the critical relative orientation of the axes of pulleys 38, 40 and 41, which positively prevents excessive translation of belt 21 along return pulley 41, which would cause the belt to ride off return pulley 41 and/or forward pulley 40 under normal high speed operating conditions. Basically, this is achieved in the belt supporting system described above by forwardly canting the relatively outer end of pulley 41, as viewed in FIGS. 2 and 5, such that axis 41a forms an angle $\alpha$ of between about 87° and 89°, and preferably 88°, with a vertically disposed plane, which extends longitudinally with respect to casing 10 and is defined by idler pulley axis 38a and the longitudinally center line C.L. of arm 26 and casing 10.

Tests indicate that the preferred orientation of pulleys 38, 40 and 41 is achieved when axes 40a, 41a define a plane, which extends generally horizontally of arm 26 and casing 10 and is intersected at a substantially right angle by idler pulley axis 38a; axes 40a, 41a diverge, as viewed in FIGS. 2 and 5 in the direction of idler pulley 38; and forward pulley axis 40a forms a right angle with the above mentioned vertical plane, such that axes 40a, 41a are relatively inclined at an angle $\theta$ of between 1° and 3° and preferably 2°.

When the axes of pulleys 38, 40 and 41 are arranged in the manner described above, belt 21 does not undergo excessive translation axially of pulley 41. For other pulley orientations, it has been found that wear occurring along the upper or lower marginal edges of belt 21, as viewed in FIG. 1 adjacent pulley 38, causes the belt to translate axially of pulley 41 to the right or left, respectively, as viewed in FIG. 3. If the rims of pulley 41 have a spacing slightly greater than belt 21, as is conventional, the belt would be caused to rub against same such that the belt would be destroyed. If the rims were to be widely spaced, as is done in the case of the present invention, the belt would tend to translate to an excessive extent, such that the belt might ride off forward pulley 40. This condition occurs even though the belt engaging surfaces of the pulleys are crowned in an effort to insure proper belt tracking.

Now referring to FIGS. 1, 2 and 6, it will be seen that a feature of the present invention is the provision of a guide device 50, which includes a guide plate 52 fixed to the projecting end of arm 26, as by machine screws 54 passing through stepped spacers 55, 56. Guide plate 52 defines a planar guide surface 58, which is elongated in a direction lengthwise of arm 26 and is inclined relative to a vertically disposed plane extending lengthwise of arm 26 through the C.L. as viewed in FIG. 2. Guide surface 52 is arranged to constrain belt 21, when moving between forward pulley 40 and idler pulley 38, to undergo substantially a 90° twist intermediate the forward pulley and the guide surface, to move in flat surface sliding engagement with the guide surface throughout the length thereof and to undergo substantially no change in direction in passing from the guide surface to the idler pulley.

The slight tensioning of belt 21 resulting from the use of guide device 52 has no adverse effects on the tracking of the belt.

Guide device 52 effectively prevents belt gouging of flat surfaces, which would otherwise occur when using a conventional resilient platen strip of the type employed in U.S. Patent 3,427,757. However, if desired, a platen strip 60 may be mounted on the belt return side of arm 26 to permit the tool to be used for flat surface operations, when guide device 52 is removed to permit entrance of the tool into minimum size work access openings.

Normally, it is desired to employ the maximum width of belt, such as indicated in FIGS. 1-5, which is consistent with the direction change pulley size and casing clearance considerations in order to maximize the belt area available for grinding and/or polishing operations. Thus, the maximum width of belt 21 determines the maximum required axial length of idler pulley 38. Also, it is normally desirable to maximize the diameter of idler pulley 38 in order to "flatten" the belt as much as possible, thereby reducing grooving of the work when the idler pulley forms a back up support for the belt against the work.

However, where cramped operating conditions exist, as for instance where the tool must be passed through a small access opening, it is necessary to reduce the dimension of both the idler pulley and its supporting assembly as much as possible and preferably to a size which permits the cross-sectional configuration of arm 26 alone to limit entry of the tool.

To achieve the above objectives, the free end of the projecting portion of arm 26 is of generally square cross-sectional design and provided with end opening cutouts 70, 71 disposed on the relatively upper and lower surfaces thereof and a vertically extending through bore opening 72; and support assembly 36 is formed as a unit including a pair of plate members 76 and 77, which retain the ends of idler pulley mounting shaft 78. Assembly 36 is removably mounted by passing a machine screw 80 through plate member openings 82 and 83 and arm bore opening 72; plate member bosses 84 and 85 being wholly or partially received within cutouts 70, 71 to lock assembly 36 against rotation relative to arm 26 about the axis of screw 80. As in U.S. Patent 3,427,757 idler pulley 38 is provided with suitable bearing devices, not shown, by which the pulley is journaled on shaft 78.

When the maximum sized belt and idler pulley are employed, as indicated in FIG. 1, apertured discs 88 and 89, shown only in FIG. 6, are employed to space plate member bosses 84 and 85 from the planar supporting surfaces of end opening cutouts 70 and 71. As the axial length of the idler pulley is decreased to permit passage of the tool through more confined access openings, the thickness of discs 88, 89 employed will be decreased in order to reduce the distance between plate members 76 and 77. When discs 88 and 89 are omitted, plate members 76 and 77 are disposed flush with the upper and lower surfaces of arm 26, as shown in FIG. 7, thereby permitting entrance of the tool to be limited only by the size of the arm. It will be understood that the use of discs 88 and 89 permit the same sized plate members to be employed in forming each of the support assembly units, and thus simplifies the construction and reduces cost. Of course, plate members and belts of greater length than that illustrated may be employed, whenever the depths of the surfaces to be reached dictates.

We claim:

1. In a hand tool grinding device having an endless abrasive surfaced belt, a drive means, a casing for supporting said drive means, said drive means including a belt driving pulley having its axis of rotation extending generally longitudinally with respect to said casing, a belt supporting idler pulley mounted externally of said casing and having its axis of rotation extending generally vertically with respect to said casing, a pair of crown-surfaced direction change pulleys for supporting flights of said belt extending between said drive and idler pulleys, said direction change pulleys having their axes of rotation extending generally transversely in said casing, the improvement comprising:
   mounting one of said direction change pulleys supporting the flight of said belt moving in a direction from said idler pulley towards said drive pulley for rotation about an axis arranged at an angle of between about 1 and 3 degrees relative to the axis of the other of said direction change pulleys, said axes of said direction change pulleys lying within a plane intersected at substantially right angles by said idler pulley axis and diverging in the direction of said idler pulley, and the axis of said other direction change pulley being arranged at substantially right angles to a vertically disposed plane extending longitudinally of said casing and within which said axis of said idler pulley is disposed.

2. A grinding device according to claim 1, wherein said angle is about 2 degrees.

3. A hand tool grinding device comprising in combination:
   an endless abrasive surfaced belt;
   drive means;
   a casing for supporting said drive means, said drive means including a belt driving pulley having its axis of rotation extending generally longitudinally in said casing;
   an elongated arm mounted by said casing for pivotal movement about an axis extending generally transversely of said casing, said arm having one end thereof projecting longitudinally from said casing;
   a belt supporting idler pulley mounted on said one end of said arm and having its axis of rotation extending generally vertically relative to said arm;
   a pair of crown-surfaced direction change pulleys mounted on another end of said arm for respectively supporting flights of said belt extending between said drive and idler pulleys, said direction change pulleys having axes of rotation extending generally transversely of said arm and said casing so as to cause portions of said flights extending between said direction change pulleys and said idler pulley to undergo a substantially 90° twist and to stradde that portion of said arm projecting from said casing, one of said direction change pulleys supporting the flight of said belt moving in a direction from said idler pulley towards said drive pulley having its axis of rotation arranged at an angle of between about 1 and 3 degrees relative to the axis of the other of said direction change pulleys, said direction change pulley axes lying within a plane intersected at substantially right angles by said idler pulley axis and diverging in the direction of said idler pulley, and said other direction change pulley axis being arranged at substantialy right angles to a vertically disposed plane extending longitudinally of said arm and said casing and within which said axis of said idler pulley is disposed;
   means tending to pivot said arm such as to releasably retain said belt trained about said pulleys.

4. A hand tool grinding device according to claim 3, wherein said angle is about 2 degrees.

5. A hand tool grinding device according to claim 3, wherein a guide device is fixed to said arm, said guide device defining a planar guide surface elongated in a direction lengthwise of said arm and inclined relative to said vertically disposed plane, said guide surface constraining said portion of said belt extending between said other direction change pulley and said idler pulley to undergo said substantially 90 degree twist intermediate said other direction change pulley and said guide surface, to move in flat surface sliding engagement with said guide surface throughout the length thereof, and to undergo substantially no change in direction in passing from said guide surface to said idler pulley.

6. A hand tool grinding device according to claim 3, wherein said one end of said arm is formed with end opening cutouts in relatively upper and lower surfaces thereof and a through bore opening passing vertically between said cutouts; said idler pulley is mounted on said one end of said arm by an assembly including upper and lower mounting plate members, a shaft for mounting said idler pulley and having its ends mounted by said plate members, and screw means, said screw means being received within openings in each said plate members and said bore opening for clampingly mounting said plate members on said one end of said arm, said plate members when mounted being at least partially received one within each of said opening cutouts; and means are removably positioned within said opening cutouts to vary receipt of said plate members therewithin, the last said means being removably fixed within said cutouts by said screw means.

7. In a hand tool grinding device having an endless abrasive surfaced belt, drive means, a casing for supporting said drive means, said drive means including a belt driving pulley having its axis of rotation extending generally longitudinally with respect to said casing, an elongate arm mounted on said casing and projecting longitudinally therefrom, a belt supporting idler pulley mounted on a projecting end of said arm and having its axis of rotation extending generally vertically with respect to said casing, a pair of direction change pulleys mounted on said arm for respectively supporting flights of said belt extending between said drive and idler pulleys, said direction change pulleys having their axes of rotation extending generally transversely of said casing and causing portions of said flights extending between said direction change pulleys and said idler pulley to undergo a substantially 90° twist and to straddle that portion of said arm projecting from said casing, the improvement comprising:

a guide device fixed to said projecting arm portion, said guide device defining a planar guide surface elongated in a direction lengthwise of said projecting arm portion and inclined relative to a vertically disposed plane extending lengthwise of said projecting arm portion, said guide surface constraining said belt when transversing the flight thereof moving from said drive pulley towards said idler pulley to undergo substantially a 90° twist intermediate said direction change pulleys and said guide surface, to move in flat surface sliding engagement with said guide surface throughout the length thereof, and to undergo substantially no change in direction in passing from said guide surface to said idler pulley.

References Cited
UNITED STATES PATENTS

| | | | |
|---|---|---|---|
| 3,427,757 | 2/1969 | Redman | 51—170 EB |
| 3,496,679 | 2/1970 | Dunn | 51—170 EB |

WILLIAM R. ARMSTRONG, Primary Examiner

U.S. Cl. X.R.

51—135 BT, 148